(12) United States Patent (10) Patent No.: US 12,665,698 B2
Yu et al. (45) Date of Patent: ***Jun. 23, 2026

(54) SYSTEMS AND METHODS TO GENERATE COPIES OF DATA FOR TRANSMISSION OVER MULTIPLE COMMUNICATION CHANNELS

(71) Applicant: Dolby Laboratories Licensing Corporation, San Francisco, CA (US)

(72) Inventors: Mingchao Yu, Sydney (AU); Mark Craig Reed, Gordon (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/883,113

(22) Filed: Sep. 12, 2024

(65) Prior Publication Data

US 2025/0007645 A1 Jan. 2, 2025

Related U.S. Application Data

(63) Continuation of application No. 17/989,117, filed on Nov. 17, 2022, now Pat. No. 12,119,928, which is a
(Continued)

(51) Int. Cl.
H04L 1/00 (2006.01)
G06F 9/48 (2006.01)
(Continued)

(52) U.S. Cl.
CPC .......... H04L 1/0041 (2013.01); H04L 1/0033 (2013.01); H04L 1/0045 (2013.01);
(Continued)

(58) Field of Classification Search
CPC ... H04L 1/0041; H04L 1/0045; H04L 1/0033; H04L 12/4015; H04L 29/08945;
(Continued)

(56) References Cited

U.S. PATENT DOCUMENTS 6,675,284 B1 1/2004 Warren
7,249,291 B2 7/2007 Rasmussen
(Continued)

FOREIGN PATENT DOCUMENTS

CN 1689243 A 10/2005
CN 1735079 A 2/2006
(Continued)

OTHER PUBLICATIONS

Asorey-Cacheda, R. et al "A Joint Interchannel and Network Coding Schema for nVoD Services over Wirelss Mesh Networks" Global Telecommunications Conference, Nov. 30, 2009, pp. 1-8.
(Continued)

*Primary Examiner* — Albert Decady
*Assistant Examiner* — Osman M Alshack

(57) ABSTRACT

Systems and methods to transmit data over multiple communication channels in parallel with forward error correction. Original packets are evenly distributed to the channels as the initial systematically channel-encoded packets. Subsequent channel-encoded packets are configured to be linearly independent of their base sets of channel-encoded packets, where a base set for a subsequent channel-encoded packet includes those scheduled to be transmitted before the subsequent packet in the same channel as the subsequent packet, and optionally one or more initial packets from other channels. The compositions of the sequences of the encoded packets can be predetermined without the content of the packets; and the channel-encoded packets can be generated from the original packets on-the-fly by the transmitters of the channels during transmission. When a sufficient number of packets have been received via the channels, a recipient may terminate their transmissions.

18 Claims, 9 Drawing Sheets

Related U.S. Application Data continuation of application No. 16/750,185, filed on Jan. 23, 2020, now Pat. No. 11,509,417, which is a continuation of application No. 15/405,874, filed on Jan. 13, 2017, now Pat. No. 10,581,554.

(51) Int. Cl.
| | |
|---|---|
| *G06F 13/37* | (2006.01) |
| *H04L 12/40* | (2006.01) |
| *H04L 67/60* | (2022.01) |

(52) U.S. Cl.
CPC ............ *G06F 9/4881* (2013.01); *G06F 13/37* (2013.01); *H04L 12/4015* (2013.01); *H04L 67/60* (2022.05)

(58) Field of Classification Search
CPC .................. H04L 29/082; H04L 67/60; H04L 2001/0096; H04L 1/0061; H04L 1/083; G06F 9/4881; G06F 13/37
USPC ................................................. 714/752, 776
See application file for complete search history.

(56) References Cited

U.S. PATENT DOCUMENTS

| | | | | |
|---|---|---|---|---|
| 8,078,746 | B2 | 12/2011 | Asami | |
| 8,996,946 | B2 | 3/2015 | Wu | |
| 9,185,429 | B1 * | 11/2015 | Gu | H04N 19/174 |
| 9,236,885 | B2 | 1/2016 | Shokrollahi | |
| 9,271,123 | B2 | 2/2016 | Medard | |
| 9,338,789 | B2 * | 5/2016 | Wang | H04W 74/06 |
| 9,413,494 | B2 | 8/2016 | Luby | |
| 9,641,803 | B1 * | 5/2017 | Badr | H04L 1/0013 |
| 2002/0105960 | A1 | 8/2002 | Das | |
| 2003/0053435 | A1 | 3/2003 | Sindhushayana | |
| 2005/0063378 | A1 * | 3/2005 | Kadous | H04L 1/0002 |
| | | | | 370/389 |
| 2006/0064626 | A1 | 3/2006 | Fischer | |
| 2008/0151897 | A1 | 6/2008 | Nemoto | |
| 2009/0201871 | A1 | 8/2009 | Sambhwani | |
| 2010/0094955 | A1 | 4/2010 | Zuckerman | |
| 2010/0095184 | A1 | 4/2010 | Zuckerman | |
| 2012/0008721 | A1 | 1/2012 | Wippich | |
| 2012/0057547 | A1 * | 3/2012 | Lohr | H04W 72/04 |
| | | | | 370/329 |
| 2012/0290582 | A1 | 11/2012 | Oikarinen | |
| 2012/0314655 | A1 | 12/2012 | Xue | |
| 2013/0028247 | A1 | 1/2013 | Li | |
| 2013/0100970 | A1 * | 4/2013 | Vafin | H04N 21/44004 |
| | | | | 370/516 |
| 2013/0294447 | A1 * | 11/2013 | Myung | H04L 69/22 |
| | | | | 370/389 |
| 2014/0075085 | A1 | 3/2014 | Schroder | |
| 2014/0269289 | A1 | 9/2014 | Effros | |
| 2015/0355966 | A1 * | 12/2015 | Resch | G06F 3/067 |
| | | | | 714/766 |
| 2016/0112308 | A1 * | 4/2016 | Ficara | H04L 12/417 |
| | | | | 370/401 |
| 2016/0294508 | A1 | 10/2016 | Takeuchi | |

FOREIGN PATENT DOCUMENTS

| | | |
|---|---|---|
| CN | 1906870 A | 1/2007 |
| CN | 1875590 A | 10/2010 |
| CN | 101142774 A | 11/2012 |
| CN | 101286773 B | 12/2012 |
| CN | 101455098 B | 2/2013 |
| CN | 101978635 A | 3/2015 |
| CN | 103561407 B | 11/2016 |
| CN | 103986674 B | 6/2017 |
| DE | 102010031411 A1 | 4/2012 |
| EP | 2549700 B1 | 1/2016 |
| JP | 2001189752 A | 7/2001 |
| WO | 2009102872 A1 | 8/2009 |

OTHER PUBLICATIONS

Haas, Z. et al "Cluster-Based Cooperative Communication with Network Coding in Wireless Networks" IEEE, The 2010 Military Communications Conference—Unclassified Program-Waveforms and Signal Processing Track, pp. 2082-2089, Oct. 31, 2010.

Li Ming et al: "Tolerating path heterogeneity in multipath TCP with bounded receive buffers", Computer Networks, Elsevier, Amsterdam, NL, vol. 64, Feb. 6, 2014 (Feb. 6, 2014), pp. 1-14, XP028847394.

Xu Changqiao et al: "CMT-NC: Improving the Concurrent Multipath Transfer Performance Using Network Coding in Wireless Networks", IEEE Transactions On Vehicular Technology, IEEE, USA, vol. 65, No. 3, Mar. 1, 2016 (Mar. 1, 2016), pp. 1735-1751, XP011602692.

* cited by examiner

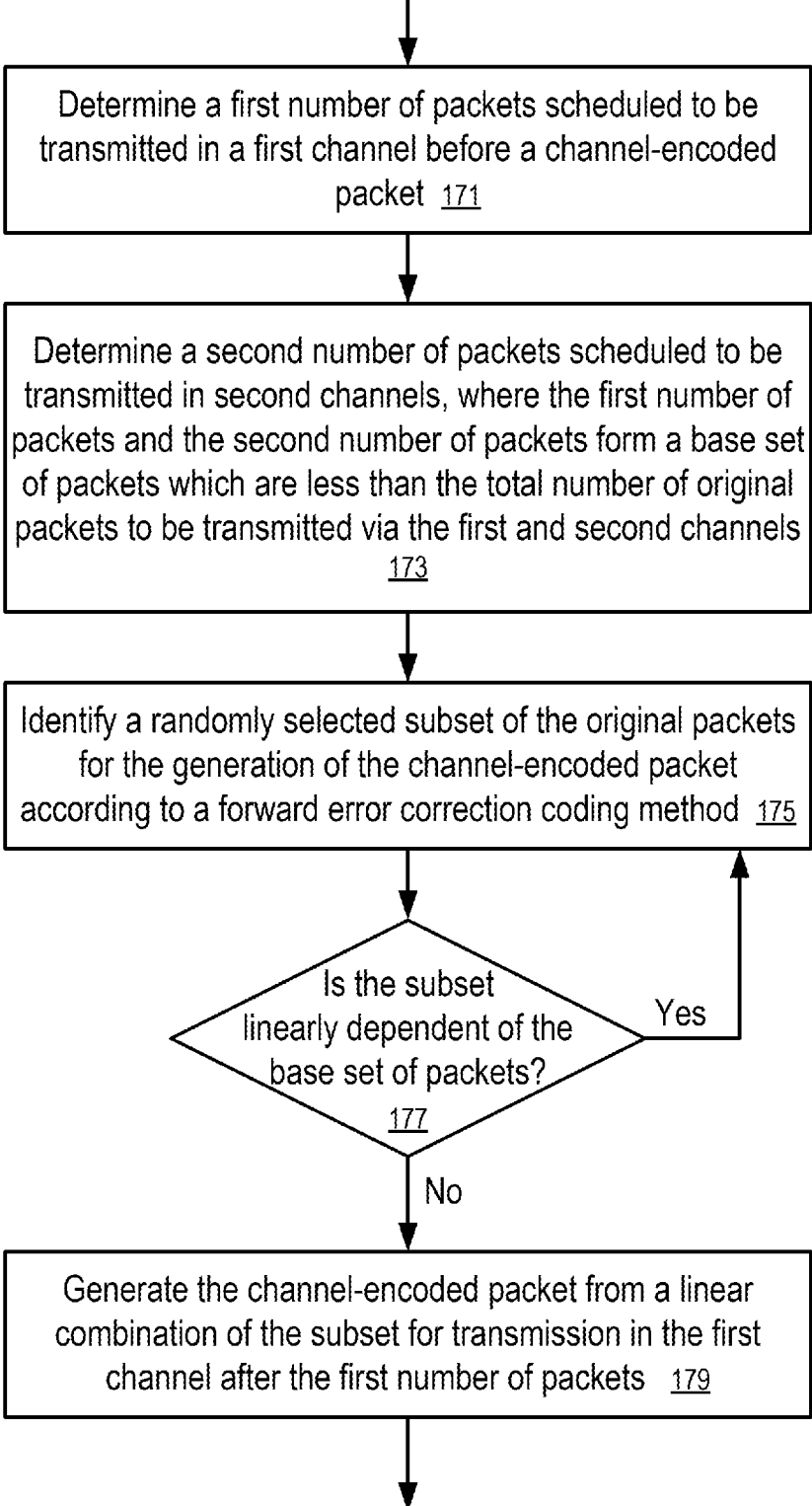

Determine a first number of packets scheduled to be transmitted in a first channel before a channel-encoded packet 171

Determine a second number of packets scheduled to be transmitted in second channels, where the first number of packets and the second number of packets form a base set of packets which are less than the total number of original packets to be transmitted via the first and second channels 173

Identify a randomly selected subset of the original packets for the generation of the channel-encoded packet according to a forward error correction coding method 175

Is the subset linearly dependent of the base set of packets? 177

Yes

No

Generate the channel-encoded packet from a linear combination of the subset for transmission in the first channel after the first number of packets 179

FIG. 7

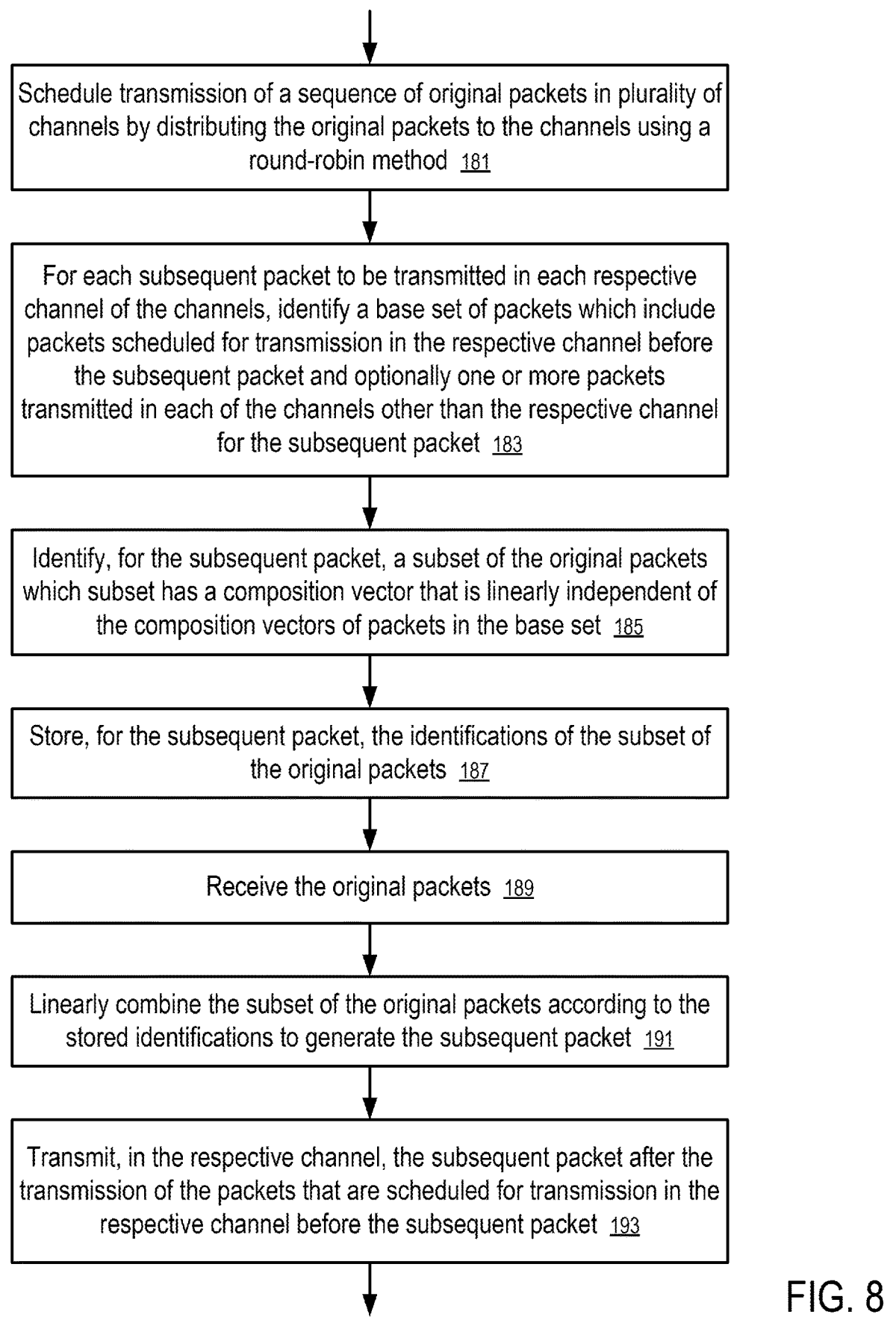

Schedule transmission of a sequence of original packets in plurality of channels by distributing the original packets to the channels using a round-robin method 181

For each subsequent packet to be transmitted in each respective channel of the channels, identify a base set of packets which include packets scheduled for transmission in the respective channel before the subsequent packet and optionally one or more packets transmitted in each of the channels other than the respective channel for the subsequent packet 183

Identify, for the subsequent packet, a subset of the original packets which subset has a composition vector that is linearly independent of the composition vectors of packets in the base set 185

Store, for the subsequent packet, the identifications of the subset of the original packets 187

Receive the original packets 189

Linearly combine the subset of the original packets according to the stored identifications to generate the subsequent packet 191

Transmit, in the respective channel, the subsequent packet after the transmission of the packets that are scheduled for transmission in the respective channel before the subsequent packet 193

FIG. 8

SYSTEMS AND METHODS TO GENERATE COPIES OF DATA FOR TRANSMISSION OVER MULTIPLE COMMUNICATION CHANNELS

RELATED APPLICATIONS

This application is a continuation of U.S. patent application Ser. No. 17/989,117, filed Nov. 17, 2022, now U.S. Pat. No. 12,119,928, which is a continuation of U.S. patent application Ser. No. 16/750,185, filed Jan. 23, 2020, now U.S. Pat. No. 11,509,417 issued on Nov. 22, 2022, which is a continuation of U.S. patent application Ser. No. 15/405,874, filed Jan. 13, 2017, now U.S. Pat. No. 10,581,554 issued on Mar. 3, 2020, the entire contents of each are hereby incorporated by reference.

FIELD OF THE TECHNOLOGY

At least some embodiments disclosed herein relate to parallel communications over a plurality of communication channels and forward error correction techniques.

BACKGROUND

Forward Error Correction (FEC) is a coding technique typically used for correcting errors in data transmission over communication channels. Using FEC a sender provides redundant data in the stream of communicated data to enable the recipient to detect errors in the received data and/or recover a copy of the original data from the correctly received data without requiring a reverse communication from the recipient to the sender to request retransmission of missing data or received data that has error.

FEC adds redundant data by transforming the original information into channel-encoded outputs using an algorithm. The original information may or may not appear literally in the encoded output. Outputs that include the unmodified input are systematic, while outputs that do not include the unmodified input are non-systematic. A recipient decodes the non-systematic outputs to reassemble the original information from the received outputs. Rateless erasure codes can potentially generate a limitless sequence of encoding symbols from a given set of original symbols such that the original symbols can be recovered from a subset of the encoding symbols of size equal to or larger than the number of original symbols. The rateless FEC does not have a fixed code rate.

U.S. Pat. No. 9,413,494, entitled "FEC-based Reliable Transport Control Protocols for Multipath Streaming", discloses the transmission of forward-error corrected data, from a server device to a client device, via a plurality of parallel network paths. The client device reports, to the server device, the losses of the data in the network paths for the retransmission of the data lost in the network paths.

U.S. Pat. No. 7,249,291, entitled "System and Method for Reliably Communicating the Content of a Live Data Stream", discloses a method to transmit a live data stream to a recipient using multiple channels, where a forward error correction algorithm is applied to generate FEC-encoded blocks.

U.S. Pat. No. 9,236,885, entitled "Systematic Encoding and Decoding of Chain Reaction Codes", discloses that in certain applications it may be preferable to transmit the source symbols first, and then to continue transmission by sending output symbols. Such a coding system was referred to as a systematic coding system.

U.S. Pat. No. 9,015,564, entitled "Content Delivery System with Allocation of Source Data and Repair Data among HTTP Servers", discloses a source server storing content in a source form, a broadcast sever generating and storing repair symbols, and repair servers requesting broadcast of repair data when byte-range requests from multiple receivers overlap.

U.S. Pat. App. Pub. No. 2010/0094955, entitled "Methods and Systems for using a Distributed Storage to its Maximum Bandwidth", discloses a method to generate multiple coded fractional copies of a data segment, which are stored in multiple storage devices. A subset of the coded copies will be fully downloaded for data recovery, and in case of recovery failure, more coded copies will be fully downloaded.

U.S. Pat. No. 8,078,746, entitled "Distribution Method, Preferably Applied in a Streaming System", discloses a method to generate, at peer receivers of a network, FEC-coded feed packets of the portion of the broadcast data they have received, so that all peer receivers can download sufficient feed packets from any other peer receivers to recover the entire broadcast data.

U.S. Pat. No. 8,996,946, entitled "Application of Fountain Forward Error Correction Codes in Multi-link Multi-path Mobile Networks", discloses a method to generate different on-the-fly FEC encoded packets of a data segment and send these packets through different unreliable paths that are coupled with a receiver until the receiver has acknowledged or the time is out.

U.S. Pat. App. Pub. No. 2014/0269289, entitled "Method and Apparatus for Improving Communication Performance through Network Coding", discloses a method to generate different on-the-fly network coding encoded packets of a data segment and send these packets through different unreliable paths that are coupled with a receiver. The receiver may send intermediate feedback to the transmitter to manage retransmissions. In case the data segment cannot be fully recovered, partial recovery will be attempted.

The entire disclosures of the above identified patents are hereby incorporated herein by reference.

BRIEF DESCRIPTION OF THE DRAWINGS

The embodiments are illustrated by way of example and not limitation in the figures of the accompanying drawings in which like references indicate similar elements.

FIG. 7 shows a method to generate a channel-encoded packet according to one embodiment.

FIG. 8 shows a method to transmit a data segment according to one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1:
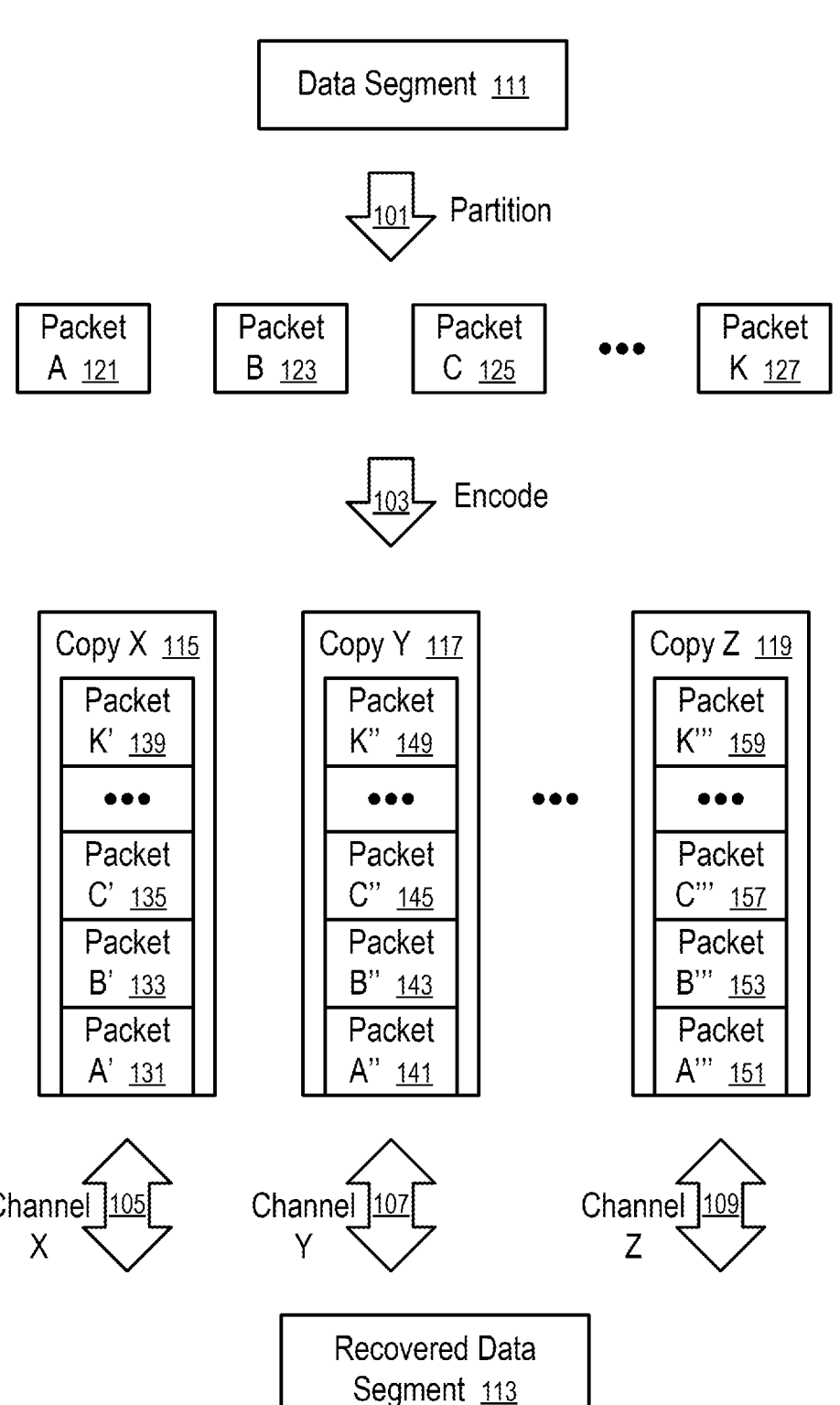
FIG. 1 shows a technique to transmit a data segment via FEC over multiple parallel channels according to one embodiment.

At least some embodiments disclosed herein provide solutions to improve the efficiency, reliability, and overall speed of data transmission via multiple communication channels, in a system as illustrated in FIG. 1. The data transmission technique uses a rateless FEC technique, which partitions the original data segment into original packets of an equal-length and generates channel-coded packets from linear combinations of various subsets of the original packets.

FIG. 1 shows a technique to transmit a data segment via FEC over multiple parallel channels according to one embodiment.

In FIG. 1, a data segment (111) is transmitted via a plurality of parallel communication channels (105, 107, . . . , 109). The use of the parallel communication channels (105, 107, . . . , 109) generally increases the overall speed of the transmission of the data segment (111).

However, the actual performances of the individual communication channels (105, 107, . . . , 109) may vary at the time of transmission. Packets transmitted in one or more of the channels (e.g., 105, 107, . . . , or 109) may have longer, random delays than other packets transmitted via others channels (e.g., 105, 107, . . . , or 109). As a result, the sequence of the combined set of packets received in a recipient device from the channels (105, 107, . . . , 109) is randomized at the time of transmission.

Thus, it is a challenge to schedule the packets for the transmission in the communication channels (105, 107, . . . , 109) with reduced redundancy data and a reduced time period during which a sufficient number of useful packets are received via the parallel communication channels (105, 107, . . . , 109) for the reconstruction of the recovered data segment (113) that is the same as the original data segment (111).

In FIG. 1, the data segment (111) is partitioned (101), or divided, into a plurality of packets (121, 123, 125, . . . , 127) of the same length. Dummy bytes may be padded so that the packets (121, 123, 125, . . . , 127) have the same length and thus allow the use of a forward error correction technique. Using a forward error correction technique, the system channel encodes (103) the original packets (121, 123, 125, . . . , 127) to generate different channel-encoded copies (115, 117, . . . , 119) of the data segment (111) that carry redundant information in the copies (115, 117, . . . , 119) for the respective channels (105, 107, . . . , 119).

For example, in FIG. 1, a typical channel-encoded packet (e.g., 131, 133, 135, . . . , 139; 141, 143, 145, . . . , 149; . . . ; 151, 153, 157, . . . , or 159) generated using a typical forward error correction technique is a predetermined function of a random subset of original packets (121, 123, 125, . . . , 127). The predetermined function typically generates a linear combination of the subset of the original packets (121, 123, 125, . . . , 127) (e.g., through an exclusive or (XOR) operation) as a channel-encoded packet. When a sufficient number of channel-encoded packets are received via the channels (105, 107, . . . , 109), the received set of channel-encoded packets can be decoded via the respective forward error correction technique to provide the original set of packets (121, 123, 125, . . . , 127) and thus the recovered data segments (113).

In FIG. 1, the individual channels (e.g., 105, 107, . . . , or 109) may be reliable in the quality of data transmission (e.g., using a reliable protocol). When there is a missing packet or a packet having an error is received, the retransmission of the missing packet or packet having an error can be requested through any channels (e.g., 105, 107, . . . , or 109) using an appropriate protocol. However, the speed performances of channels (e.g., 105, 107, . . . , or 109) may be not be consistent, which incurs delays and duplications to the retransmissions. Embodiments disclosed herein provide solutions to improve the performance of the system by reducing duplicated (and thus useless) data and reducing the time period for the transmission of a sufficient set of useful packets for the recovery of the data segment (113).

In some instances, it is desirable to use separate transmitters to send the copies (115, 117, . . . , 119) through the channels (105, 107, . . . , 109) independently from each other. The transmitters may not have communications with each other to coordinate their transmissions of the copies (115, 117, . . . , 119). The system of FIG. 1 is configured such that when a recipient device receives a combined set of sufficient packets from channels (105, 107, . . . , 109), the recipient device can generate, from the combined set of received packets, the recovered data segment (113) that is the same as the original data segment (111), without having to wait for the completion transmission of the copies (115, 117, . . . , 119). The recipient device may simply terminate its receiving operations before the complete transmission of the copies (115, 117, . . . , 119) and/or request the termination of the transmission operations.

For example, when a combined set of sufficient packets is received for the recovered data segment (113), the recipient device provides an indication to the transmitting system to terminate the transmission of the remaining packets of the copies (115, 117, . . . , 119) in the channels (105, 107, . . . , 109), such that the network resources can be used for other transmission tasks.

For example, the recipient device may use the channels (115, 117, . . . , 119) to request the respective transmitters coupled to the channels (115, 117, . . . , 119) to terminate their transmission of their copies (e.g., 115, 117, . . . , 119). Alternatively, the recipient device may notify a centralized server, using one of the channels (105, 107, . . . , 109) or a separate communication channel, which server then further notifies the respective transmitters coupled to the respective channels (115, 117, . . . , 119) to terminate their transmissions.

Figure 2:
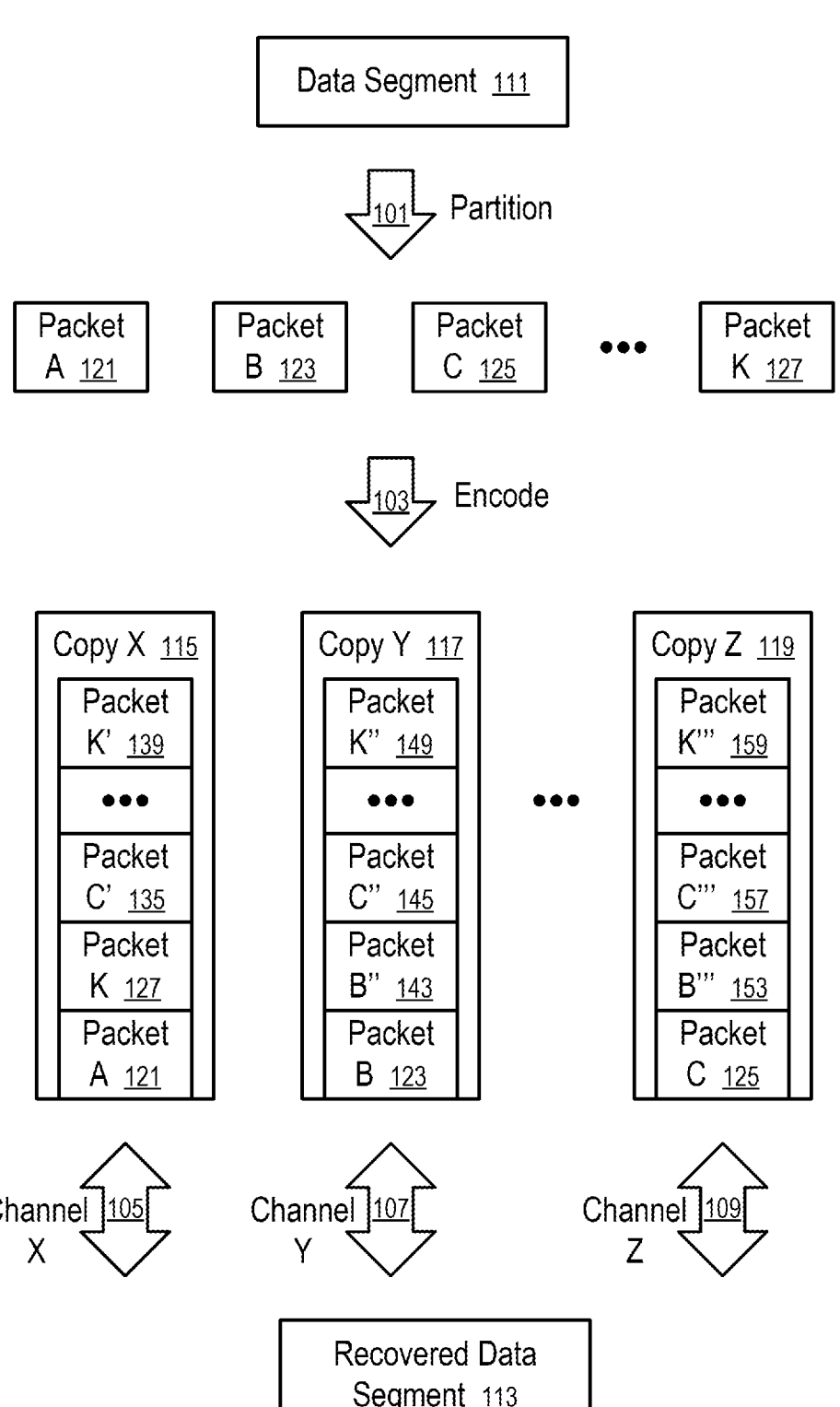
FIG. 2 shows a technique to transmit a data segment via FEC over multiple parallel channels using an initial systematic phase according to one embodiment.

The system of FIG. 1 can be further improved by distributing the original packets as initial packets (or leading packets) in the copies (115, 117, . . . , 119) that are transmitted prior to the transmission of channel-encoded packets (or non-systematic) of the respective copies (115, 117, . . . , 119), as illustrated in FIG. 2.

Alternatively or in combination, the system of FIG. 1 can be further improved by rejecting, in the random selection of the original packets for channel-encoding using the forward error correction technique, channel-encoded packets that do not, or are not likely to, contribute to the recovered data segment (113), in view of a base set of packets that have been, or likely, received by the recipient device before the transmission of such packets. Thus, data redundancy is reduced without impacting the performance of forward error correction, as illustrated in FIG. 3.

Figure 3:
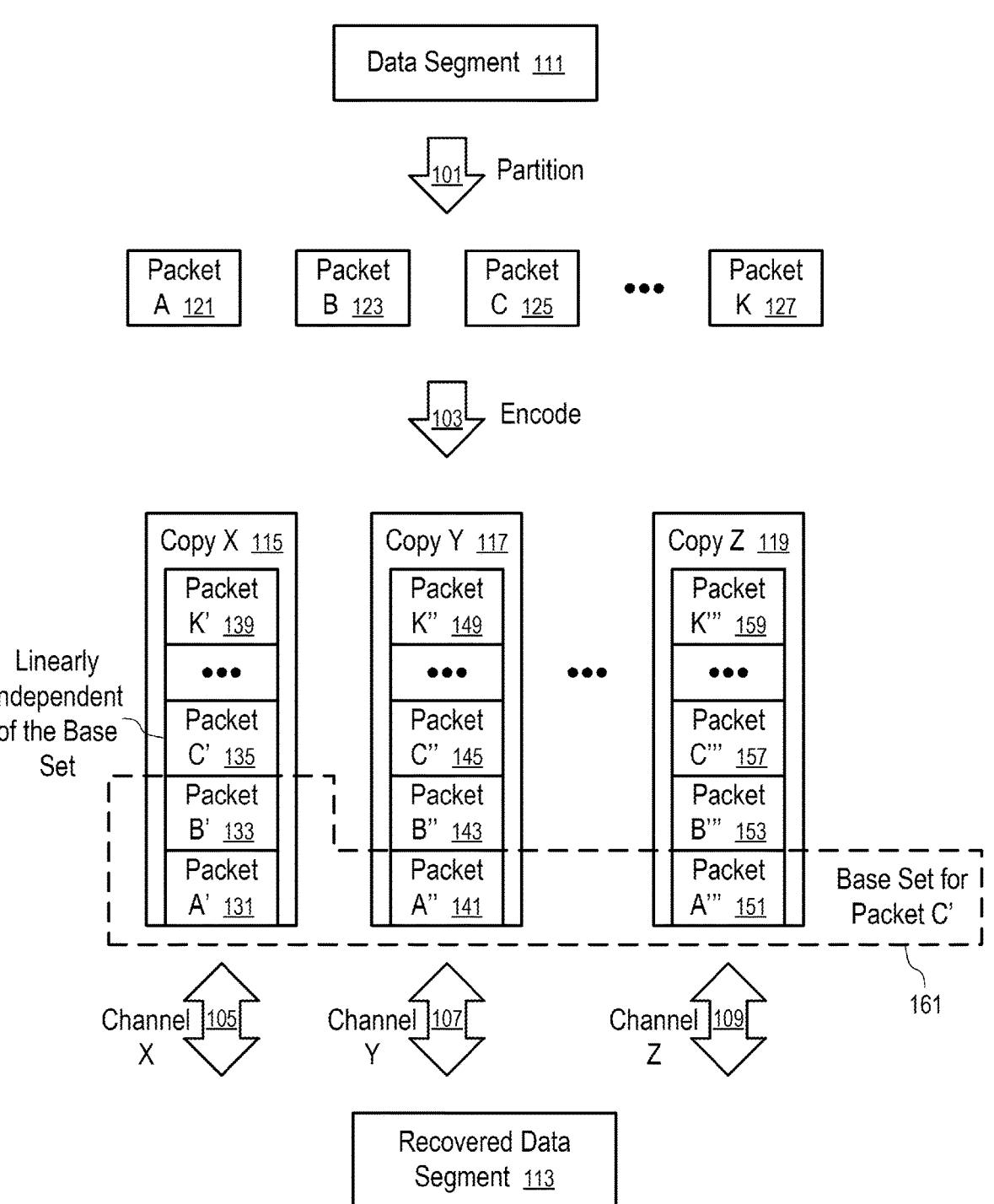
FIG. 3 shows a technique to transmit a data segment via FEC over multiple parallel channels using encoded packets that are linearly independent of their base sets according to one embodiment.

In general, the techniques of FIG. 2 and FIG. 3 can be combined.

Further, for a given number of the original packets (121, 123, 125, . . . , 127) and a given number of the channels (e.g., 105, 107, . . . , 109), the system can predetermine the composition of the channel-encoded packets (131, 133, 135, . . . , 139; 141, 143, 145, . . . , 149; . . . 151, 153, 157, . . . , 159). The composition of a channel-encoded packet (131, 133, 135, . . . , 139; 141, 143, 145, . . . , 149; . . . ; 151, 153, 157, . . . , or 159) identifies the identity/identities of the subset of the original packets (121, 123, 125, . . . , 127) used to generate the channel-encoded packet. For example, each of the original packets (121, 123, 125, . . . , 127) can be identified based on its sequence/position number in the sequence of the original packets (121, 123, 125, . . . , 127) (or another type of identification symbol) without its actual data of the original packet. The compositions of the channel-encoded packets (131, 133, 135, . . . , 139; 141, 143, 145, . . . , 149; 151, 153 157, . . . , 159) for the encoded copies (115, 117, . . . , 119) can be stored without the actual data of the original packets. When the actual data of the original packets (121, 123, 125, . . . 127) is available, the compositions of the channel-encoded packets (131, 133, 135, . . . , 139; 141, 143, 145, . . . , 149; . . . ; 151, 153, 157, . . . , 159) are retrieved to combine the respective original packets (121, 123, 125, . . . , 127) identified by the compositions to generate the respective channel-encoded packets (131, 133, 135, . . . , 139; 141, 143, 145, . . . , 149; . . . ; 151, 153, 157, . . . , 159).

For example, at the time of the transmission, a transmitter receives the set of original packets (121, 123, 125, . . . , 127) and the sequence of compositions for the scheduled sequence of channel-encoded packets (e.g., 131, 133, 135, . . . , 139; 141, 143, 145, . . . , 149; . . . ; or 151, 153, 157, . . . , 159). The transmitter combines the original packets (121, 123, 125, . . . , 127) according to the compositions to generate the respective channel-encoded packets just before transmitting the generated packets for transmission over the respective channel (e.g., 105, 107, . . . , or 109). Thus, when the recipient device signals for the early termination of the transmission, the remaining channel-encoded packets do not have to be actually generated and/or stored.

FIG. 2 shows a technique to transmit a data segment via FEC over multiple parallel channels using an initial systematic phase according to one embodiment. For example, the technique of FIG. 2 can be used in a system illustrated in FIG. 1.

In FIG. 2, each copy (e.g., 115, 117, . . . , or 119) scheduled to be transmitted via a respective channel (e.g., 105, 107, . . . , 109) has a sequence of scheduled packets (121, 127, 135, . . . , 139; 123, 143, 145, . . . , 149; . . . ; or 125, 153, 157, . . . , 159). The copies (115, 117, . . . , 119) have a set of initial packets (121, 123, . . . , 125, 127) that correspond to the set of original packets (121, 123, 125, . . . , 127).

In each of the channels (105, 107, . . . , 109), the initial packets of a respective copy (e.g., 115, 117, . . . , 119) are transmitted before other packets of the respective copy (e.g., 115, 117, . . . , 119). For example, the initial packets (121, 127) of Copy X (115) are transmitted before the transmission of packets (135, . . . , 139) of Copy X (115); the initial packet (123) of Copy Y (117) is transmitted before the transmission of packets (143, 145, . . . , 149) of Copy Y (117); and the initial packet (125) of Copy Z (119) is transmitted before the transmission of packets (153, 155, . . . , 159) of Copy Z (119).

The initial packets (121, 123, . . . , 125, 127) are generated/identified by distributing the set of original packets (121, 123, 125, . . . , 127) to the copies (115, 117, . . . , 119).

For example, when the channels (105, 107, . . . , 109) have the same nominal/average/expected transmission speed, the original packets (121, 123, 125, . . . , 127) can be distributed to the copies (115, 117, . . . , 119) substantially evenly. For example, the original packets (121, 123, 125, . . . , 127) can be distributed one at a time to the copies according to a round-robin scheme until all of the original packets (121, 123, 125, . . . , 127) are distributed to the copies (115, 117, . . . , 119). Alternatively, the system computes the average number of original packets (e.g., by dividing the number of packets by the number of channels and taking the integer part of the result), assigns the average number of original packets to each copy, and randomly distribute the remaining, unassigned packets one at a time to the copies (115, 117, . . . , 119) until all of the original packets (121, 123, 125, . . . , 127) are assigned.

In instances where the channels (105, 107, . . . , 109) have substantially different nominal/average/expected transmission speeds, the original packets (121, 123, 125, . . . , 127) can be distributed to the copies (115, 117, . . . , 119) in a ratio approximately equal to the ratio of their nominal/average/expected transmission speeds.

Once all original packets have been distributed as the initial packets of the copies (e.g., 115, 117, . . . , 119), channel-encoded packets (e.g., 135, 143, 145, . . . , 149, 153, 157, . . . , 159) are generated and added to the copies (e.g., 115, 117, . . . , 119). Each channel-encoded packet (e.g., 135) of a given copy (e.g., 115) can be generated from a linear combination of a random selected subset of all the original packets (e.g., 121, 123, 125, . . . , 127).

Preferably, each channel-encoded packet (e.g., 135) of a given copy (e.g., 115) can be generated from a linear combination of a random selected subset of the original packets (e.g., 123, 125) carried by other copies (e.g., 117, . . . , 119) another than the given copy (e.g., 115). In other words, the set of original packets (e.g., 121, 127) carried by the given copy (e.g., 115) is not used for the generation of the channel-encoded packets (e.g., 135, . . . , 139) of this given copy (e.g., 115). This is because by the time a channel-encoded packet (e.g., 135) of this given copy (e.g., 115) is received, the recipient device will already have received all the original packets (e.g., 121, 127) carried by this given copy (e.g., 115). Excluding these original packets will reduce both computational complexity and the probability of generating useless channel-encoded packets.

FIG. 3 shows a technique to transmit a data segment via FEC over multiple parallel channels using channel-encoded packets that are linearly independent of their base sets according to one embodiment. For example, the technique of FIG. 3 can be used in a system illustrated in FIGS. 1 and/or 2.

In FIG. 3, the transmission of data packets within each channel (105, 107, . . . , 109) is reliable. Thus, at the time of the transmission of a subsequent packet (e.g., 135) in the channel (e.g., 105), the recipient device has correctly received the data packets (e.g., 131, 133) that have been transmitted in the same channel (e.g., 105) before the subsequent packet (e.g., 135). Thus, a candidate for the subsequent channel-encoded packet (e.g., 135) that is linearly dependent of the received data packets (e.g., 131, 133) is useless and can be rejected.

Further, by the time of the transmission of the subsequent packet (e.g., 135) in the channel (e.g., 105), it is very likely that the recipient device has received the initial packets (e.g., 141, . . . , 151) transmitted in other channels (e.g., 107, . . . , 109). The subsequent packet (e.g., 135) can be considered to have a base set (161) of packets (131, 133, 141, . . . , 151) that include all the packets (e.g., 131, 133) in the same channel (e.g., 105) that are scheduled to be transmitted before the subsequent packet (e.g., 135) and the initial packets (e.g., 141, . . . , 151) of the other channels (e.g., 107, . . . , 109) that are very likely to have reached the recipient device via other channels (e.g., 107, . . . , 109) before the transmission of the subsequent packet (e.g., 135). A candidate for the subsequent packet (e.g., 135) that is linearly dependent of the base set is most likely useless and thus can be rejected.

To ensure/improve the usefulness of the channel-encoded packet (135), the system of FIG. 3 is configured to identify the subsequent channel-encoded packet (135) such that it is linearly independent of the base set (161) of packets (131, 133, 141, . . . , 151), where the base set (161) includes all the packets (e.g., 131, 133) that are scheduled in the copy (115) before the subsequent channel-encoded packet (135), and the certain initial packets (e.g., 141, . . . , 151) of the other copies (117, . . . , 119).

In determining the initial packets (e.g., 141, . . . , 151) of the other copies (117, . . . , 119) for the base set (161) for the subsequent packet (135), it is assumed that the base set (161) is insufficient to generate the recovered data segment (113), which triggers the need to transmit the subsequent packet (135) in the channel (105). Thus, the base set (161) is identified to include less packets than the entire set of the original packets (121, 123, 125, . . . , 127).

Further, the other channels (e.g., 107, . . . , 109) are assumed to have transmitted their initial packets according to their ratio of the nominal/average/expected transmission speeds. For example, when the other channels (e.g., 107, . . . , 109) have an equal nominal/average/expected transmission speed, the same number of initial packets are selected from the other copies (e.g., 117, . . . , 119) for the base set (161) of the subsequent packet (135).

For example, the initial packets (e.g., 141, . . . , 151) of the other copies (117, . . . , 119) can be selected for the base set (161) of the subsequent packet (135) of the copy (115) in the follow manner. The system determines a remaining number of packets to be transmitted in the other copies (117, . . . , 119) by reducing the number of original packets (121, 123, 125, . . . , 127) by the number of initial packets in the copy (115) up to and including the subsequent packet (135). The system then distributes the remaining number of packets to the other copies (117, . . . , 119) (e.g., according to their ratio of nominal/average/expected transmission speeds). The numbers of packets distributed to the other copies (117, . . . , 119) identifies the corresponding numbers of initial packets (e.g., 141, . . . , 151) of the other copies (117, . . . , 119) that are included in the base set (161) for the subsequent packet (135) of the copy (115).

For example, there are K original packets (121, 123, 125, . . . , 127); the subsequent packet (135) is the k'th packet in the copy (115); and the system uses M channels (105, 107, . . . , 109) to transmit the M copies (115, 117, . . . , 119) respectively in parallel. The remaining number of packets to be distributed to the other copiesqj (117, . . . , 119) is (K−k). When the other channels (107, . . . , 109) have the same nominal/average/expected transmission speed, the other copies (e.g., 117, . . . , 119) have an average of (K−k)/(M−1) initial packets of their respective copies (117, . . . , 119) that are selected as the base set (161) for the subsequent packet (135). When (K−k)/(M−1) is not an integer, and d is the integer that is closest to (K−k)/(M−1) but no larger than (K−k)/(M−1), the base set (161) may be selected to include the initial d packets of each of the other copies (e.g., 117, . . . , 119). Optionally, the base set (161) may further include an additional initial packet from (K−k)−d*(M−1) randomly selected copies of the other copies (e.g., 117, . . . , 119).

Further, when the channels (105, 107, . . . , 109) have the same nominal/average/expected transmission speed, the number of initial packets selected from each other copies (e.g., 117, . . . , 119) is not more than k−1, since at the time of the transmission of the k'th packet in channel (105), no more than k−1 packets of each other copies (e.g., 117, . . . , 119) are expected to have been transmitted through each other channels (107, . . . , 109).

The compositions of the channel-encoded packets can be used to identify whether or not a candidate for the subsequent packet (135) is linearly dependent of the base set (161). The composition of a channel-encoded packet (e.g., 135) identifies a subset of the original packets (121, 123, 125, . . . , 127) that are used in the generation of the channel-encoded packet (e.g., 135). More specifically, the composition of the channel-encoded packet (e.g., 135) identifies which of the original packets (121, 123, 125, . . . , 127) are used in the generation of the channel-encoded packet (e.g., 135) and which are not. For example, the composition of a channel-encoded packet can be represented by a vector of symbols, where the i'th symbol of vector is either zero when the i'th original packet is not used in the generation of the channel-encoded packet, or one when the i'th original packet is used in the generation of the channel-encoded packet.

The subsequent packet (135) can be selected such that the composition vector of the subsequent packet (135) is linearly independent of the composition vectors of the packets (131, 133, 141, . . . , 151) in the base set (161). For example, when a forward error correction technique is used to select a random subset of the original packets (121, 123, 125, . . . , 127) for the generation of the subsequent packet (135), the system checks whether the random subset has a composition that is linearly independent of the compositions of the packets in the base set (161); if so, the random subset is accepted as the composition of the subsequent packet (135); otherwise, the random subset is rejected, and another random subset is selected.

Since each subsequent packet (e.g., 135) scheduled in a copy (e.g., 115) is at least linearly independent of the packets scheduled before the subsequent packet in the same copy (e.g., 115), the copy (e.g., 115) requires at most the same count of packets (e.g., 131, 133, 135, . . . , 139) as the original packets (121, 123, 125, . . . , 127).

Figure 4:
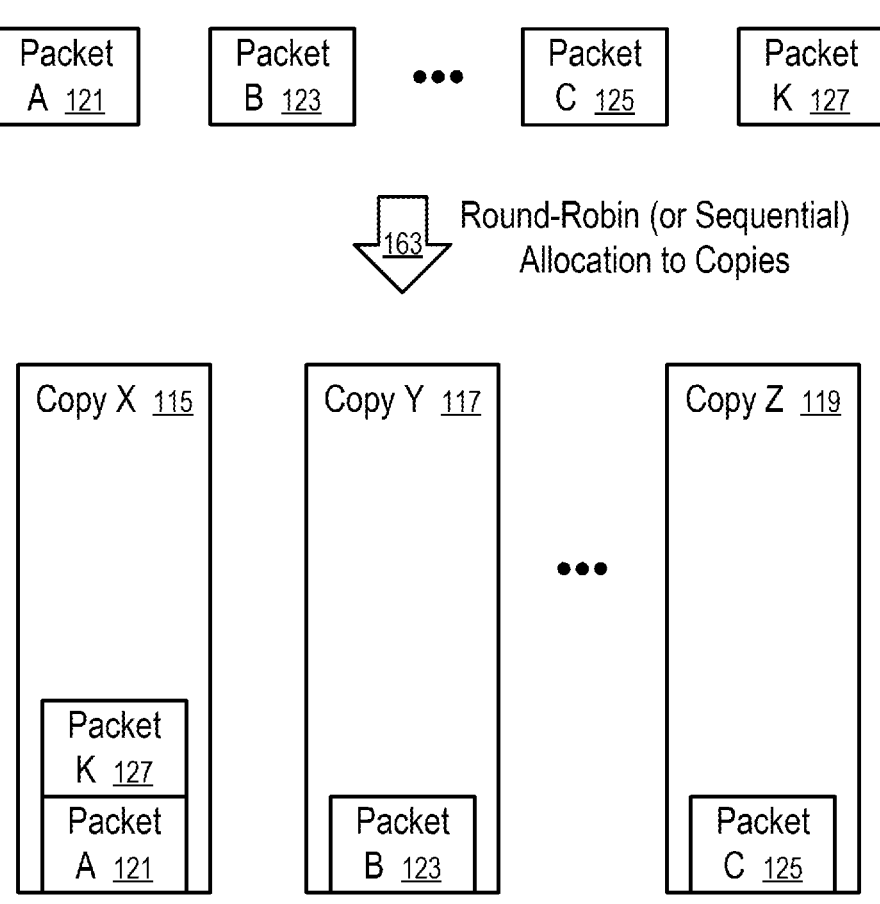
FIG. 4 shows scheduling of systematic packets over multiple parallel channels according to one embodiment.

FIG. 4 shows scheduling of systematic packets over multiple parallel channels according to one embodiment. For example, the scheduling technique of FIG. 4 can be used in the system of FIG. 2.

In FIG. 4, the initial packets (121, 123, . . . , 125, 127) of the copies (115, 117, . . . , 119) are generated by round-robin allocation (163) of the original set of packets (121, 123, . . . , 125, 127) to the copies (115, 117, . . . , 119). As discussed above, the round-robin allocation (163) can be performed according to the ratio of the nominal/average/expected transmission speeds of channels used to transmit the copies (115, 117, . . . , 119) in parallel.

The round-robin allocation (163) can be performed without the actual data of the original packets (121, 123, . . . , 125, 127). The compositions of the initial systematic packets (121, 123, . . . , 125, 127) identify the respective original packets (121, 123, . . . , 125, 127) that are literally copied into the respective initial systematic packets (121, 123, . . . , 125, 127).

Figure 5:
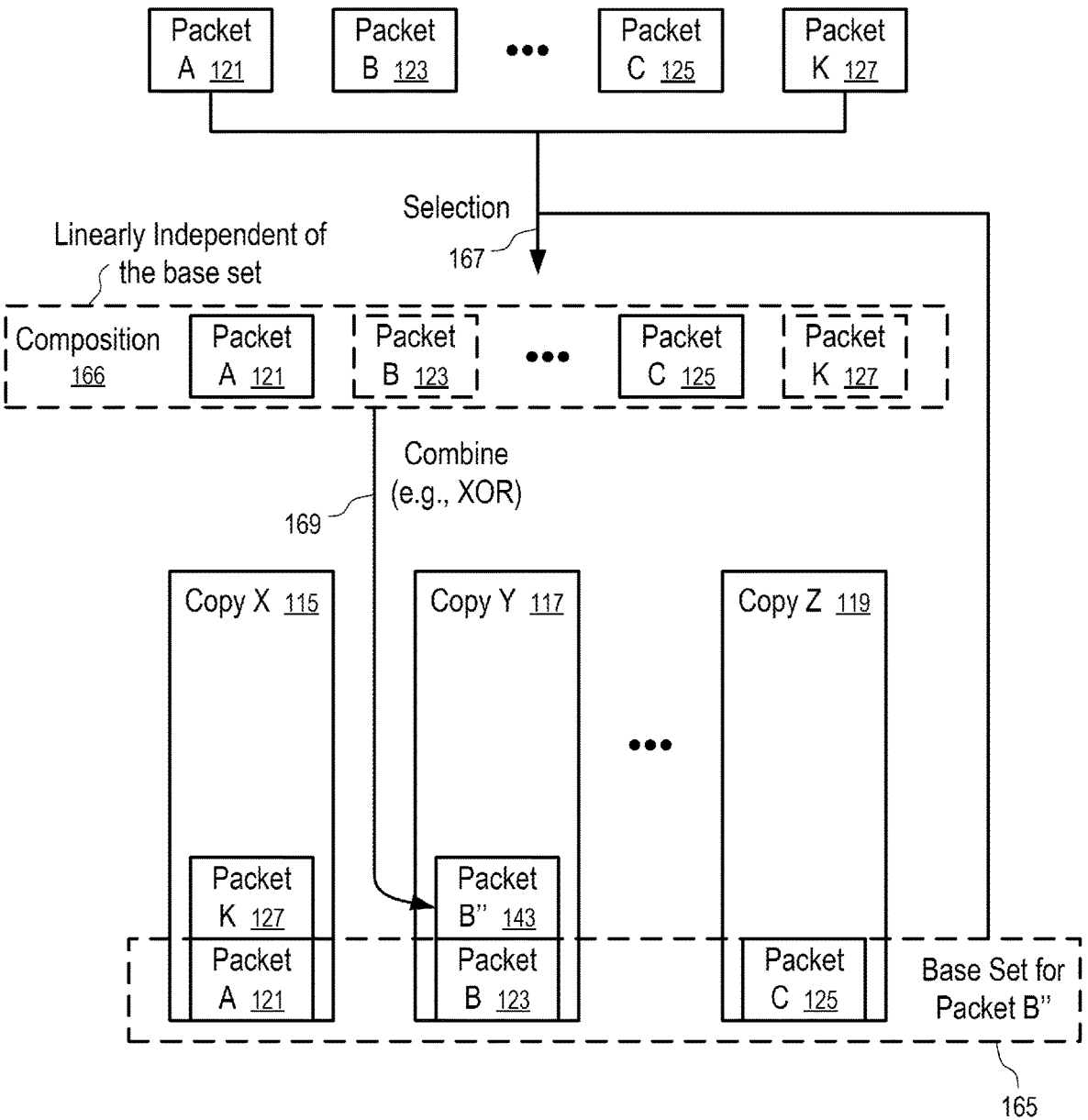
FIG. 5 shows the identification of the composition of a channel-encoded packet according to one embodiment.

Subsequent channel-encoded packets for the copies (115, 117, . . . , 119) can be generated using any forward error correction technique in general and more preferably, in a way as illustrated in FIG. 3 or FIG. 5.

FIG. 5 shows the identification of the composition (166) of a channel-encoded packet (143) according to one embodiment. For example, the scheduling technique of FIG. 5 can be used in combination the techniques of FIG. 3 or FIG. 4. Although FIG. 5 illustrates an example where a set of the initial packets of the copies (115, 117, . . . , 119) are original packets, the method of FIG. 5 can also be applied to the use of channel-encoded initial packets in the copies (115, 117, . . . , 119).

In FIG. 5, a base set (165) is identified for the packet (143) scheduled to be transmitted after the packet (123) in the copy (117). The base set (165) is insufficient to reconstruct the entire set of the original packets (121, 123, . . . , 125, 127); and the base set (165) includes packets that are expected (or most likely) to have been received in a recipient device at the time the packet (143) is to be transmitted if the copies (115, 117, . . . , 119) are transmitted in parallel using multiple channels (e.g., 105, 107, . . . , 109). Examples of methods to identify the base set (165) are discussed above in connection with FIG. 3.

In FIG. 5, the compositions of the packets in the base set (165) are used to identify the composition (166) of the channel-encoded packet (143). Specifically, the composition (166) is generated by randomly selecting (167) a subset from the original packets (121, 123, . . . , 125, 127) (e.g., according to a distribution function of a forward error correction technique). In FIG. 5, solid boxed packets (e.g., 121, . . . , 125) in the composition (166) are illustrated as the packets of the subset that is selected for the generation of the channel-encoded packet (143); and the dash boxed packets (e.g., 123, . . . , 127) in the composition (166) are illustrated as the packets not selected for the generation of the channel-encoded packet (143). In FIG. 5, the random selection of the subset is repeated (e.g., according to the predetermined distribution function) until the composition vector of the selected subset is linearly independent of the composition vectors of the packets (e.g., 121, 123, . . . , 125) in the base set (165). The selected composition (166) of the channel-encoded packet (143) ensures that the packet (143) is useful, and thus not redundant, when it is used in combination with the packets (121, 123, . . . , 125) in base set (165) during channel decoding. Since at least some useless packets are pre-filtered during the selection of the compositions of the subsequent channel-encoded packets, the technique improved the efficiency in the use of the network channels during the transmission of the channel-encoded copies (115, 117, . . . , 119).

Further, to reduce computational complexity the composition (166) can be selected such that the packets (e.g., 121, . . . , 125) selected in the composition (166) to compute the channel-encoded packet (143) of the copy (117) do not include the original packets (e.g., 123) that are scheduled to be transmitted in the copy (117) before the channel-encoded packet (143) and/or do not include the original packets (121, 123, . . . , 125) in the base set (165). For example, the random selection of packets for the composition (166) may be limit to the subset of original packets that do not include the leading original packets (e.g., 123) of the copy (117) and/or the original packets (121, 123, . . . , 125) in the base set (165) to reduce both computational complexity in channel-encoding and the probability of generating a composition that is linearly dependent of the base set (165).

The composition (166) can be stored as an intermediate result such that at a later time when the actual packet (143) is to be used (e.g., for transmission over a communication channel), the composition (166) can be used to select original packets that are combined (169) (e.g., via exclusive or (XOR) or another linear combination function) to generate the content of the channel-encoded packet (143).

Since the scheduling of the subsequent packet (143) does not require the actual data/content of the original packets (121, 123, . . . , 125, 127), the selection (167) of original packets (121, 123, . . . , 125, 127) for further subsequent packets can be performed in a similar way based on the stored compositions of the packets that have already scheduled in the copies (115, 117, . . . , 119). Thus, the compositions of all of the packets in the copies (115, 117, . . . , 119) can be pre-computed and stored for the predetermined number of original packets (121, 123, . . . , 125, 127) without the actual packet data/content. This allows the scheduling of the packets before transmission and before the content of the packets (121, 123, . . . , 125, 127) becomes available. At the time of transmission, a transmitter retrieves the compositions of the packets scheduled in the respective copy (e.g., 117) and combines the original packets according to the compositions (e.g., 166) to generate the packet (e.g., 143) just in time for its transmission.

Figure 6:
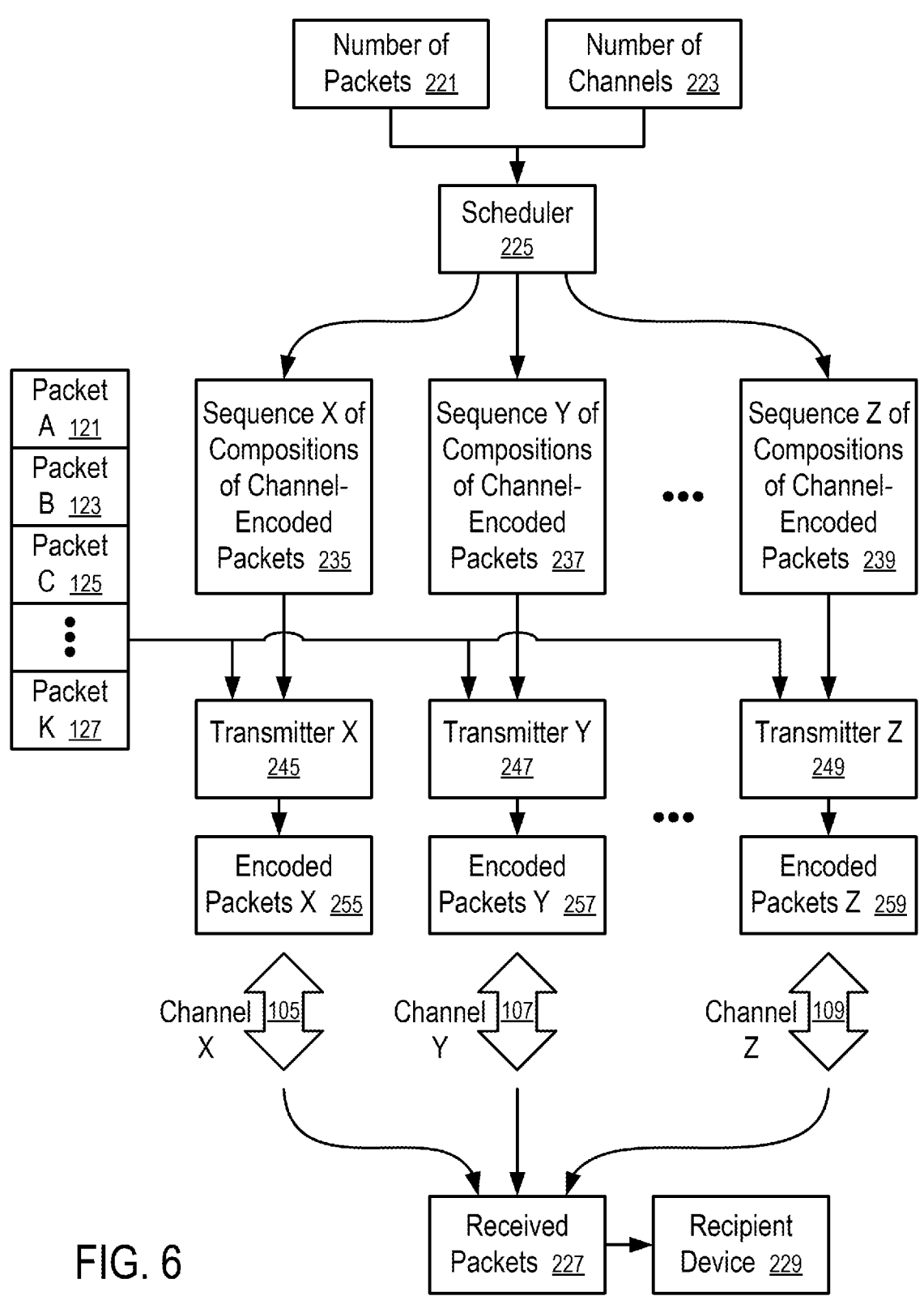
FIG. 6 shows a system to transmit data packets using multiple channels according to one embodiment.

FIG. 6 shows a system to transmit data packets using multiple channels according to one embodiment. For example, the system of FIG. 6 can be implemented to use techniques of FIGS. 1, 2 and/or 3.

In FIG. 6, a scheduler (225) computes the sequences (235, 237, . . . , 239) of compositions of channel-encoded packets (e.g., 255, 257, . . . , 259) based on the number (221) of the original packets (121, 123, 125, . . . , 127) from which the channel-encoded packets (e.g., 255, 257, . . . , 259) are generated and the number (223) of the channels (105, 107, . . . , 109) that will be used for the transmissions of the channel-encoded packets (e.g., 255, 257, . . . , 259).

For example, the compositions of initial channel-encoded packets of the sequences (235, 237, . . . , 239) can be determined using a method of FIG. 4; and compositions of subsequent channel-encoded packets of the sequences (235, 237, . . . , 239) can be determined using a method of FIG. 5.

Alternatively, the compositions of at least some of the initial channel-encoded packets of the sequences (235, 237, . . . , 239) and/or the subsequent channel-encoded packets of the sequences (235, 237, . . . , 239) can be determined based on a random process without using the methods of FIG. 4 and/or FIG. 5.

In FIG. 6, the sequences (235, 237, . . . , 239) of compositions are provided to the transmitters (245, 247, . . . , 249) that are coupled with the respective channels (105, 107, . . . , 109) for the transmission of the respective channel-encoded packets (255, 257, . . . , 259). The transmitters (245, 247, . . . , 249) receive the same copy of the original packets (121, 123, 125, . . . , 127). Using the respective sequences (235, 237, . . . , 239) of compositions, the transmitters (245, 247, . . . , 249) apply a predetermined function (e.g., XOR) to original packets identified in the respective compositions to generate the sequences of channel-encoded packets (255, 257, . . . , 259) for transmission to the recipient device (229).

Preferably, each of the transmitters (245, 247, . . . , 249) generates a subsequent channel-encoded packet for a sequence (e.g., 235, 237, . . . , or 239) after the channel-encoded packets scheduled before the subsequent channel-encoded packet in the sequence have been successfully transmitted through the respective channel (e.g., 105, 107, . . . , 109).

Alternatively, channel-encoded packets (e.g., 255, 257, . . . , 259) may be pre-generated before the transmission. For example, the scheduler (225) may generate the sequences of the channel-encoded packets (e.g., 255, 257, . . . , 259) and provide the channel-encoded packets (e.g., 255, 257, . . . , 259) directly to the transmitters (e.g., 245, 247, . . . , 249), instead of providing the combination of the original packets (121, 123, 125, . . . , 127) and the sequences (235, 237, . . . , 239) of compositions of the channel-encoded packets (255, 257, . . . , 259). In some instances, some of the transmitters (e.g., 247) are configured to receive the sequence channel-encoded packets (e.g., 257), while other transmitters (e.g., 245) are configured to receive the sequences (e.g., 235) of compositions and the original packets (e.g., 121, 123, 125, . . . , 127) to generate the channel-encoded packets (e.g., 255) on-the-fly during their transmission.

In FIG. 6, the transmitters (245, 247, . . . , 249) use the channels (105, 107, . . . , 109) to transmit the channel-encoded packets (255, 257, . . . , 259) in parallel. However, due to the real-time performance variations, the sequence of the received packets (227) obtained by the recipient device (229) from the channels (105, 107, . . . , 109) may be partially randomized. When the recipient device (229) receives a sufficient number of channel-encoded packets via any combination of the channels (105, 107, . . . , 109), the recipient device (229) can fully recover the sequence of original packets (121, 123, 125, . . . , 127) using the forward error correction technique for channel decoding.

The system of FIG. 6 allows the transmitters (245, 247, . . . , 249) to transmit their respective sequences of encoded packets (255, 257, . . . , 259) without coordination with each other. The sequences (e.g., 235, 237, . . . , 239) of the encoded packets (e.g., 255, 257, . . . , 259) are predetermined and are not changed during the transmission. Thus, there is no need for reverse communications from the recipient device (229) to the transmitters (245, 247, . . . , 249) and/or the scheduler (225) for the coordination of the generation of the channel-encoded packets across the channels (105, 107, . . . , 109).

Optionally, the recipient device (229) individually requests at least some of the transmitters (245, 247, . . . , 249) to terminate their transmissions, after the set of received packets (227) is sufficient to recover the original sequence of the original packets (121, 123, 125, . . . , 127) and before the respective transmitters (245, 247, . . . , 249) complete the transmission of their complete sequences (235, 237, . . . , 239) of encoded packets.

The recipient device may deliver any received original packets to an application (e.g., a video player) in order, determine whether any of the received channel-encoded packet is useful, and if enough useful packets have been received, it causes the termination of the transmission across the parallel channels (105, 107, . . . , 109), and applies FEC decoding to recover all of the original packets (121, 123, 125, . . . , 127).

FIG. 7 shows a method to generate a channel-encoded packet according to one embodiment. For example, the method of FIG. 7 can be used by the scheduler (225) of FIG. 6 in the determination/selection (167) of the composition (166) of a packet (143) illustrated in FIG. 5, or the generation of the subsequent packet (135) illustrated in FIG. 3.

In FIG. 7, the scheduler (225) is configured to: determine (171) a first number of packets (e.g., 131, 133) scheduled to be transmitted in a first channel (e.g., 105) before a channel-encoded packet (135); and determine (173) a second number of packets (e.g., 141, . . . , 151) scheduled to be transmitted in second channels (e.g., 107, . . . , 109). The first number of packets (e.g., 131, 133) and the second number of packets (e.g., 141, . . . , 151) form a base set (161), where the packets (e.g., 131, 133, 141, . . . , 151) in the base set (161) are less than the total number of original packets (e.g., 121, 123, 125, . . . , 127) to be transmitted via the first and second channels (e.g., 105, 107, . . . , 109).

The scheduler (225) identifies (175) a randomly selected subset of the original packets (121, 123, . . . , 127) for the generation of the encoded packet (e.g., 135) according to a forward error correction coding method. If it is determined (177) that the subset is linearly dependent of the base set (161) (e.g., based on their composition vectors), the subset is rejected; and the computing device identifies (175) another randomly selected subset, until it is determined (177) that the subset is linearly independent of the packets (e.g., 131, 133, 141, . . . , 151) in the base set (161). The identification of the subset provides the composition of the encoded packet (e.g., 135) scheduled to be transmitted after the first number of packets (e.g., 131, 133) in the first channel (e.g., 105).

In FIG. 7, the scheduler (225) (or the transmitters (245, 247, . . . , 249), or another device) generates (179) the encoded packet (135) from a linear combination (e.g., XOR) of the subset for transmission in the first channel (105) after the first number of packets (e.g., 131, 133).

FIG. 8 shows a method to transmit a data segment according to one embodiment. For example, the method of FIG. 8 can be implemented in a system illustrated in FIG. 6.

In FIG. 8, a scheduler (225) is configured to schedule (181) the transmission of a sequence of original packets (121, 123, . . . , 125, 127) in the plurality of channels (105, 107, . . . , 109) by distributing the original packets (121, 123, . . . , 125, 127) to the channels using a round-robin method (163). Preferably, the original packets (121, 123, . . . , 125, 127) distributed to the plurality of channels (105, 107, . . . , 109) function as the systematic channel-encoded packets scheduled to be transmitted in the respective channels before the transmission of other subsequent non-systematic channel-encoded packets.

In FIG. 8, for each subsequent packet (e.g., 135) to be transmitted in each respective channel (e.g., 105) of the channels, the scheduler (225) identifies a base set (e.g., 161) of packets (e.g., 131, 133, 141, . . . , 151), which may include all packets (e.g., 131, 133) that are scheduled for transmission in the respective channel (e.g., 105) before the subsequent packet (e.g., 135) and optionally one or more packets (e.g., 141, . . . , 151) scheduled for parallel transmission in each of the channels (e.g., 107, . . . , 109) other than the respective channel (e.g., 105) for the subsequent packet (e.g., 135).

In FIG. 8, the scheduler (225) identifies (185), for the subsequent packet (e.g., 135), a subset of the original packets (e.g., 123, . . . , 125, 127 as identified by the composition (166) of a subsequent packet (e.g., 143) in FIG. 5), such that the composition vector of the subset is linearly independent of the composition vectors of the packets in the base set. The subset can be randomly selected according to a forward error correction technique until the subset has a composition that is linearly independent of the compositions of the packets in the base set.

In FIG. 8, the scheduler (225) stores (187), for the subsequent packet (e.g., 135), the identifications of the subset of the original packets as the composition of the subsequent packet (e.g., 135).

After the original packets (121, 123, 125, . . . , 127) are received (189), the scheduler (225) (or a transmitter (e.g., 245), or another device) linearly combines (191) the subset of the original packets according to the stored identifications, or the stored composition of the subsequent packet (e.g., 135), to generate the subsequent packet (e.g., 135).

A transmitter (e.g., 245) transmits (193), in the respective channel (e.g., 105), the subsequent packet (e.g., 135) after the transmission of the packets (e.g., 131, 133) that are scheduled for transmission in the respective channel (e.g., 105) before the subsequent packet (e.g., 135).

In one aspect, a method implemented in a computing apparatus includes: generating, by the computing apparatus, a plurality of first data packets (121, 123, 125, . . . , 127) of a same length from a data segment (111) to be transmitted via a plurality of parallel communication channels (105, 107, . . . , 109); and identifying, by the computing apparatus (e.g., using the scheduler (225)) from the first data packets (121, 123, 125, . . . , 127), a plurality of packet sequences (115, 117, . . . , 119) for the plurality of parallel communication channels (105, 107, . . . , 109) respectively. Each respective sequence (e.g., 115) of the plurality of packet sequences includes: one or a plurality of initial packets (e.g., 131) that are original packets (121, 123, 125, . . . , 127) and that are scheduled to be transmitted before subsequent packets (e.g., 133, 135, . . . , 139) in the respective sequence (e.g., 115); and subsequent packets (e.g., 135) that are linear combinations of a subset of the original packets (e.g., 121, 123, . . . , 127). The method further includes transmitting, by the computing apparatus (e.g., using the transmitters (245, 247, . . . , 249)), the plurality of sequences (115, 117, . . . , 119) of packets in the plurality of parallel communication channels (105, 107, . . . , 109) respectively.

During the transmitting, a recipient device (229) coupled to the plurality of parallel communication channels (105, 107, . . . , 109) is configured to determine whether a received set of packets (227), received via the parallel communication channels (105, 107, . . . , 109), is sufficient to reconstruct the data segment (111). In response to a determination that the received set of packets (227) is sufficient to reconstruct the data segment (111), the recipient device (229) directly terminates the transmitting of the sequences of channel-encoded packets. Alternatively, the recipient device (229) transmits an indicator to the computing apparatus to stop the transmitting of the sequences of channel-encoded packets.

In one embodiment of the aspect, the subsequent packet (135) is generated according to a forward error correction technique, where a randomly selected subset of the original packets (121, 123, 125, . . . , 127) are combined via a predetermined function (e.g., a linear combination, an exclusive or (XOR) operation).

In one embodiment of the aspect, the method includes distributing the plurality of original packets (e.g., 121, 123, 125, . . . , 127) to the plurality of packet sequences (e.g., 115, 117, . . . , 119) for the plurality of parallel communication channels (e.g., 105, 107, . . . , 109) respectively according to a round-robin schedule (163). Alternatively, the method includes distributing the plurality of original packets (e.g.,

121, 123, 125, . . . , 127) to the plurality of packet sequences (e.g., 115, 117, . . . , 119) for the plurality of parallel communication channels (e.g., 105, 107, . . . , 109) sequentially.

In one embodiment of the aspect, the subsequent packet (e.g., 135) is selected to be linearly independent of packets (e.g., 131, 133) that include the original packet (e.g., 131) and that are scheduled to be transmitted in a respective channel (e.g., 105) before the subsequent packet (135). The subsequent packet may be further selected to be linearly independent of further packets (e.g., 141, . . . , 151) that are transmitted in the plurality of parallel communication channels (e.g., 107, . . . , 109) other than the respective channel (e.g., 105) in which the subsequent packet (135) is transmitted.

In another aspect, a method implemented in a computing apparatus includes: generating, by the computing apparatus, a plurality of original packets (121, 123, 125, . . . , 127) of a same length from a data segment (111) to be transmitted via a plurality of parallel communication channels (105, 107, . . . , 109); and identifying, by the computing apparatus (e.g., using the scheduler (225)) from the original packets, a plurality of packet sequences (115, 117, . . . , 119) for the plurality of parallel communication channels (105, 107, . . . , 109) respectively. Each respective sequence (e.g., 115) of the plurality of packet sequences includes a subsequent packet (e.g., 135) that is scheduled to be transmitted in a respective channel (e.g., 105) of the plurality of parallel communication channels and that is linearly independent of packets (e.g., 131, 133) that are scheduled to be transmitted in the respective channel (e.g., 105) before the subsequent packet (e.g., 135). Further, the subsequent packet (e.g., 135) is a linear combination of a subset of the original packets (e.g., 121, 123, 125, . . . , 127). The method further includes transmitting, by the computing apparatus (e.g., using the transmitters (245, 247, . . . , 249)), the plurality of sequences (115, 117, . . . , 119) of packets in the plurality of parallel communication channels (105, 107, . . . , 109) respectively. During the transmitting, a recipient device (229) coupled to the plurality of parallel communication channels (105, 107, . . . , 109) is configured to determine whether a received set of packets (227), received via the parallel communication channels (105, 107, . . . , 109), is sufficient to reconstruct the data segment (111); and in response to a determination that the received set of packets (227) is sufficient to reconstruct the data segment (111), the recipient device (229) directly terminates the transmitting of the sequences of channel-encoded packets. Alternatively, the recipient device (229) transmits an indicator to the computing apparatus to stop the transmission of the remaining parts of the sequences (115, 117, . . . , 119).

In one embodiment of this aspect, the subsequent packet (135) is further selected to be linearly independent of further packets (e.g., 141, . . . , 151) that are transmitted in the plurality of parallel communication channels (107, . . . , 109) other than the respective channel (105) in which the subsequent packet (135) is transmitted. For example, the further packets (e.g., 141, . . . , 151) are evenly distributed in the plurality of parallel communication channels (e.g., 107, . . . 109) other than the respective channel (105) in which the subsequent packet (135) is transmitted.

In one embodiment of this aspect, the further packets (141, . . . , 151) for the other channels (e.g., 107, . . . , 109) and the packets (e.g., 131, 133) that are scheduled to be transmitted in the respective channel (105) before the subsequent packet (135) form a base set (161) of packets; the base set (161) is selected to have fewer packets than the plurality of original packets (121, 123, 125, . . . , 127); and the subsequent packet (135) is selected to be linearly independent of the base set of data packets.

In one embodiment of this aspect, the subsequent packet (e.g., 135) is generated according to a forward error correction technique, which randomly selects the subset of the original packets (121, 123, 125, . . . , 127) according to a predetermined distribution, and combines the subset of the original packets (121, 123, 125, . . . , 127) using a linear function (e.g., exclusive or (XOR)). The random selection is repeated until the selected subset is linearly independent of the base set (161).

In one embodiment of this aspect, the method further includes: distributing the plurality of original packets (121, 123, 125, . . . , 127) to the plurality of packet sequences (115, 117, . . . , 119), according to a round-robin schedule (163), as initial packets of the packet sequences (115, 117, . . . , 119). Alternatively, the method further includes: distributing the plurality of original packets (121, 123, 125, . . . , 127) to the plurality of packet sequences (115, 117, . . . , 119) sequentially as initial packets of the packet sequences (115, 117, . . . , 119).

In a further aspect, a method implemented in a computing apparatus includes: identifying, by the computing apparatus (e.g., using the scheduler (225), compositions (e.g., 166) of a plurality of sequences (115, 117, . . . , 119) of packets to be transmitted respectively via a plurality of parallel communication channels (e.g., 105, 107, . . . , 109) to communicate a predetermined number of original packets (121, 123, 125, . . . , 127) of a same length to a recipient device (229). A composition (e.g., 166) of each respective packet (e.g., 143) in the plurality of sequences of packets includes an identification of each packet, among the original packets (121, 123, 125, . . . , 127), that is to be used to generate the respective packet (e.g., 143); and each respective sequence (e.g., 117) of the plurality of sequences includes at least one subsequent packet (143) that is a linear combination of a subset of the original packets (e.g., 121, 123, . . . , 125, 127) identified by a composition (e.g., 166) of the subsequent packet (143) to enable forward error correction. The computing apparatus stores the sequences (235, 237, . . . , 239) of compositions of the channel-encoded packets (e.g., 131, 133, 135, . . . , 139; 141, 143, 145, . . . , 149; 151, 153, 155, . . . , 159). After receiving a data segment (111), the computing apparatus generates the predetermined number of original packets (121, 123, 125, . . . , 127) from the data segment (111) and retrieves the sequences (235, 237, . . . , 239) of compositions to generate of the channel-encoded packets from the original packets (121, 123, 125, . . . , 127) according to the compositions. The computing apparatus uses the transmitters (235, 237, . . . 239) to transmit the plurality of sequences of channel-encoded packets (255, 257, . . . , 259) in the plurality of parallel communication channels (105, 107, . . . , 109) respectively. During the transmitting, the recipient device (229) determines whether a current set of received packets (227), received via the parallel communication channels (105, 107, 109), is sufficient to reconstruct the data segment (101); and if so, the recipient device (229) either directly terminates the transmission of remaining packets in each of the channels (105, 107, . . . , 109), or transmits an indicator to the computing apparatus (e.g., via the transmitters 245, 247, . . . , 249) to stop the transmission of remaining packets in each of the channels (105, 107, . . . , 109).

In one embodiment of this aspect, the identification of the sequences (115, 117, . . . , 119) includes initially distributing the plurality of original packets (121, 123, 125, . . . , 127) to the plurality of sequences (115, 117, . . . , 119) according to a round-robin or sequential schedule (163) as the initial packets of the sequences (115, 117, . . . , 119).

In one embodiment of this aspect, the channel-encoded packets are generated from the original packets (121, 123, 125, . . . , 127) according to the compositions based on an exclusive or (XOR) operation applied on subsets of the original packets (121, 123, 125, . . . , 127) identified by the compositions of the respective channel-encoded packets.

In one embodiment of this aspect, the composition (166) of the subsequent packet (143) is a randomly selected subset of the original packets (121, 123, 125, . . . , 127); and the randomly selected subset is selected such that it has a composition that is linearly independent of the compositions of: packets (123) that are queued in the respective sequence (117), in which the subsequent data packet (143) belongs, before the subsequent data packet (143); and one or more initial packets (121, 125, . . . ) that are queued in plurality of sequences (115, 119, . . . ) other than the respective sequence (117) in which the subsequent data packet (143) belongs.

Figure 9:
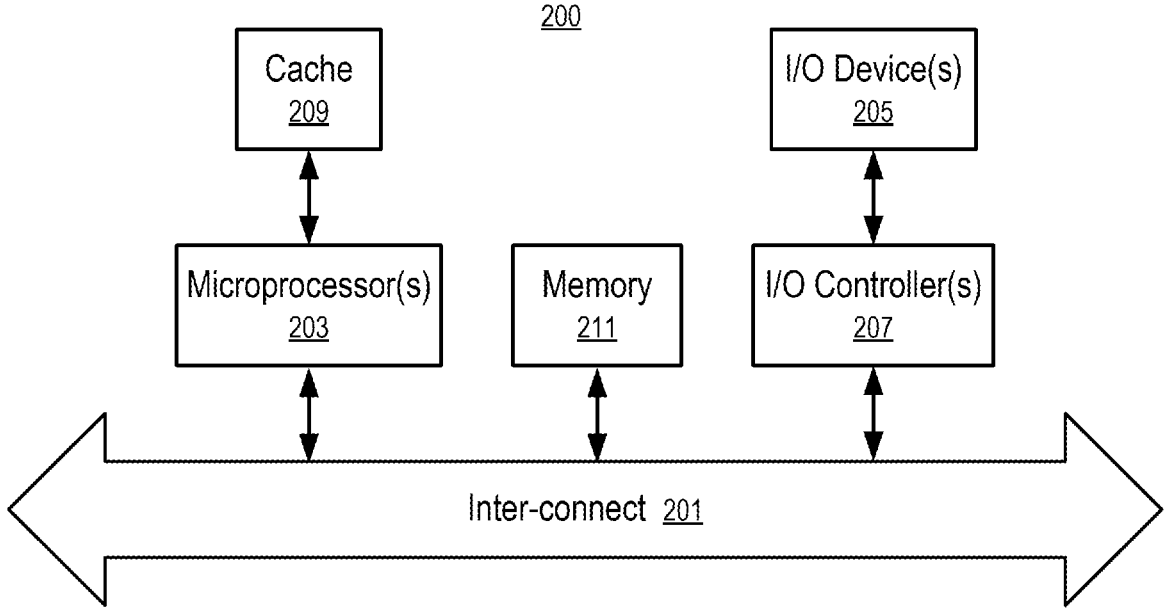
FIG. 9 shows a data processing system on which the methods of the present disclosure can be implemented.

The scheduler (225), the transmitters (245, 247, . . . , 249), the recipient device (229) and/or other devices used in the system of FIG. 6 and/or the methods discussed above can be implemented using a data processing system as illustrated in FIG. 9, with more or less components.

The present disclosure includes the methods discussed above, computing apparatuses configured to perform methods, and computer storage media storing instructions which when executed on the computing apparatuses causes the computing apparatuses to perform the methods.

FIG. 9 shows a data processing system on which the methods of the present disclosure can be implemented. While FIG. 9 illustrates various components of a computer system, it is not intended to represent any particular architecture or manner of interconnecting the components. One embodiment may use other systems that have fewer or more components than those shown in FIG. 9.

In FIG. 9, the data processing system (200) includes an inter-connect (201) (e.g., bus and system core logic), which interconnects a microprocessor(s) (203) and memory (211). The microprocessor (203) is coupled to cache memory (209) in the example of FIG. 9.

In one embodiment, the inter-connect (201) interconnects the microprocessor(s) (203) and the memory (211) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. In one embodiment, when the data processing system is a server system, some of the I/O devices (205), such as printers, scanners, mice, and/or keyboards, are optional.

In one embodiment, the inter-connect (201) includes one or more buses connected to one another through various bridges, controllers and/or adapters. In one embodiment the I/O controllers (207) include a USB (Universal Serial Bus) adapter for controlling USB peripherals, and/or an IEEE-1394 bus adapter for controlling IEEE-1394 peripherals.

In one embodiment, the memory (211) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented in a computing apparatus, the method comprising:

identifying a data segment to be transmitted via a plurality of parallel communication channels;

generating a plurality of original packets of a same length, by partitioning the data segment;

generating a plurality of channel-encoded packets by combining, using a predetermined function, a random subset of the original packets partitioned from the data segment;

via each communication channel of the plurality of parallel communication channels, transmitting (i) a respective first subset of the original packets partitioned from the data segment and (ii) a respective second subset of the channel-encoded packets; and in response to a determination by a recipient device coupled to the plurality of parallel communication channels that a received set of packets is sufficient to reconstruct the data segment, causing termination of the transmitting;

wherein a channel-encoded packet of the respective second subset is linearly independent of the original packets included in the respective first subset that are transmitted via a respective communication channel prior to the channel-encoded packet being transmitted via the respective communication channel.

2. The method according to claim 1, wherein a size of the respective first subset allocated to a corresponding parallel communication channel is proportional to a transmission speed of the corresponding parallel communication channel.

3. The method according to claim 1, wherein the predetermined function is configured to implement a forward error correction technique.

4. The method according to claim 1, wherein the predetermined function is configured to apply an XOR operation to the random subset of the original packets.

5. The method according to claim 1, wherein, for each communication channel of the plurality of parallel communication channels, original packets other than those included in the respective first subset are used to generate channel-encoded packets included in the respective second subset.

6. The method according to claim 1, wherein the channel-encoded packet of the respective second subset is linearly independent of packets that are transmitted via other communication channels besides the respective communication channel prior to the channel-encoded packet being transmitted via the respective communication channel.

7. The method according to claim 1, wherein, for each communication channel of the plurality of parallel communication channels, the respective second subset is transmitted after an entirety of the respective first subset.

8. The method according to claim 7, wherein generating the plurality of channel-encoded packets includes:

identifying the random subset of the original packets prior to generating a transmission schedule; and generating an actual data for a respective channel-encoded packet after transmitting the entirety of the respective first subset and immediately prior to transmitting the respective channel-encoded packet.

9. The method according to claim 7, wherein generating the plurality of channel-encoded packets includes:

identifying the random subset of the original packets prior to generating a transmission schedule; and generating an actual data for the plurality of channel-encoded packets prior to generating the transmission schedule.

10. The method according to claim 9, further comprising:

after identifying the random subset of the original packets, storing an identification of the random subset of the original packets in a memory.

11. The method according to claim 1, wherein causing the termination of the transmitting includes receiving an indicator from the recipient device.

12. A system comprising:

a memory; and a processor coupled to the memory, the processor configured to:

identify a data segment to be transmitted via a plurality of parallel communication channels, generate a plurality of channel-encoded packets by combining, using a predetermined function, a random subset of original packets from a plurality of original packets partitioned from the data segment, via each communication channel of the plurality of parallel communication channels, transmit (i) a respective first subset of the original packets partitioned from the data segment and (ii) a respective second subset of the channel-encoded packets, and in response to a determination by a recipient device coupled to the plurality of parallel communication channels that a received set of packets is sufficient to reconstruct the data segment, cause termination of the transmitting;

wherein a channel-encoded packet of the respective second subset is linearly independent of the original packets included in the respective first subset that are transmitted via a respective communication channel prior to the channel-encoded packet being transmitted via the respective communication channel.

13. The system according to claim 12, wherein a size of the respective first subset allocated to a corresponding parallel communication channel is proportional to a transmission speed of the corresponding parallel communication channel.

14. The system according to claim 12, wherein the predetermined function is configured to implement a forward error correction technique.

15. The system according to claim 12, wherein the predetermined function is configured to apply an XOR operation to the random subset of the original packets.

16. The system according to claim 12, wherein, for each communication channel of the plurality of parallel communication channels, original packets other than those included in the respective first subset are used to generate channel-encoded packets included in the respective second subset.

17. The system according to claim 12, wherein, for each communication channel of the plurality of parallel communication channels, the respective second subset is transmitted after an entirety of the respective first subset.

18. The system according to claim 12, wherein the channel-encoded packet of the respective second subset is linearly independent of packets that are transmitted via other communication channels besides the respective communication channel prior to the channel-encoded packet being transmitted via the respective communication channel.

* * * * *